US008143883B2

(12) United States Patent
Maerky et al.

(10) Patent No.: US 8,143,883 B2
(45) Date of Patent: Mar. 27, 2012

(54) MAGNETIC ANGULAR-POSITION SENSOR

(75) Inventors: Christophe Maerky, Saint-Ouen l'aumone (FR); Mahmoud Sfaxi, Paris (FR)

(73) Assignee: Valeo Systemes de Controle Moteur, Osny (FR)

( * ) Notice: Subject to any disclaimer, the term of this patent is extended or adjusted under 35 U.S.C. 154(b) by 643 days.

(21) Appl. No.: 10/588,912

(22) PCT Filed: Feb. 4, 2005

(86) PCT No.: PCT/FR2005/000257
§ 371 (c)(1),
(2), (4) Date: Jul. 23, 2008

(87) PCT Pub. No.: WO2005/083366
PCT Pub. Date: Sep. 9, 2005

(65) Prior Publication Data
US 2008/0272768 A1    Nov. 6, 2008

(30) Foreign Application Priority Data
Feb. 11, 2004  (FR) ...................................... 04 01344

(51) Int. Cl.
*G01B 7/30*    (2006.01)
(52) U.S. Cl. ................................. 324/207.13
(58) Field of Classification Search ........................ None
See application file for complete search history.

(56) References Cited

U.S. PATENT DOCUMENTS

| | | | | |
|---|---|---|---|---|
| 5,512,820 A | * | 4/1996 | Alfors ...................... | 324/207.22 |
| 5,544,000 A | | 8/1996 | Suzuki et al. | |
| 5,581,179 A | * | 12/1996 | Engel et al. ................ | 324/207.2 |
| 5,670,875 A | * | 9/1997 | Alfors et al. .................. | 324/202 |
| 6,476,600 B2 | * | 11/2002 | Kono et al. ................ | 324/207.2 |
| 6,940,274 B2 | * | 9/2005 | Wakiyama et al. ...... | 324/207.12 |
| 7,999,539 B2 | * | 8/2011 | Nishide .................... | 324/207.26 |
| 2003/0052669 A1 | | 3/2003 | Enomoto et al. | |

FOREIGN PATENT DOCUMENTS

| | | |
|---|---|---|
| DE | 40 25 837 | 2/1992 |
| EP | 1 120 626 | 8/2001 |
| EP | 1 353 140 | 10/2003 |
| JP | 2-122205 | 5/1990 |

OTHER PUBLICATIONS

International Search Report for PCT/FR2005/000257 dated Aug. 8, 2005 (2 pages).
Patent Abstract-European Patent Office for Japan 02122205 dated May 9, 1990 (1 page).

* cited by examiner

*Primary Examiner* — Vinh Nguyen
(74) *Attorney, Agent, or Firm* — Osha Liang LLP

(57) ABSTRACT

A magnetic angular-position sensor is mounted between two carrier elements that are movable in rotation relative to each other about an axis of rotation. The sensor has firstly a magnetic body defining a working zone in which there extends a magnetic field having field lines perpendicular to the axis of rotation, and secondly a detector member having at least one probe extending in the working zone of the magnetic member in order to provide a signal as a function of the angular orientation of the probe relative to the field lines in the working zone. The magnetic member has two parallel magnet segments and two elongate pole pieces of ferromagnetic material extending perpendicularly to the magnet segments and covering the ends thereof.

5 Claims, 2 Drawing Sheets

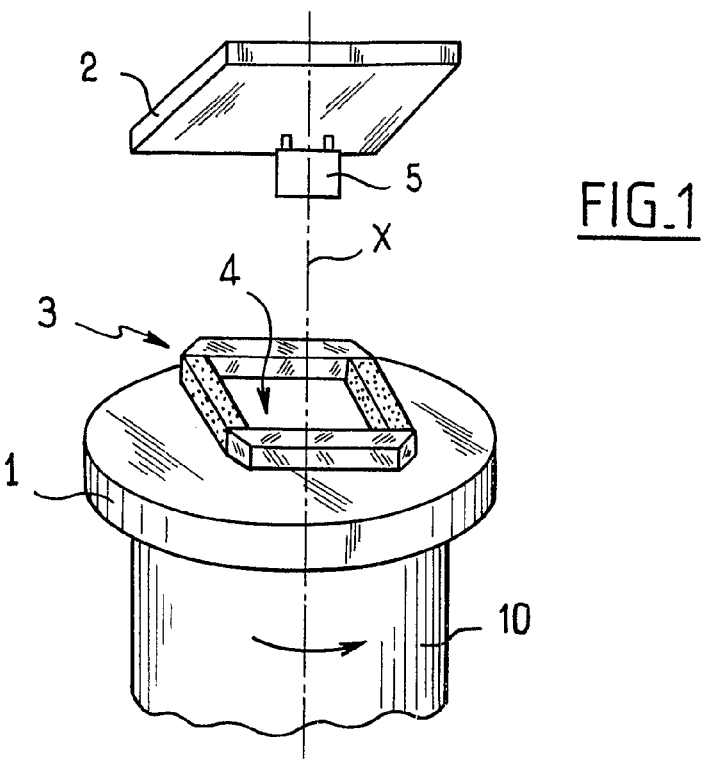
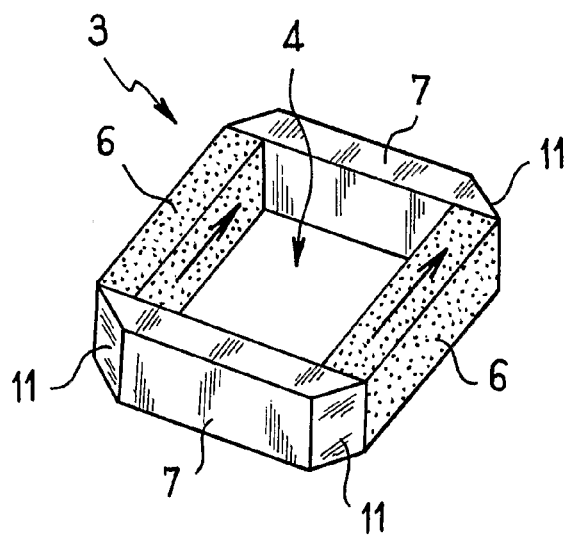
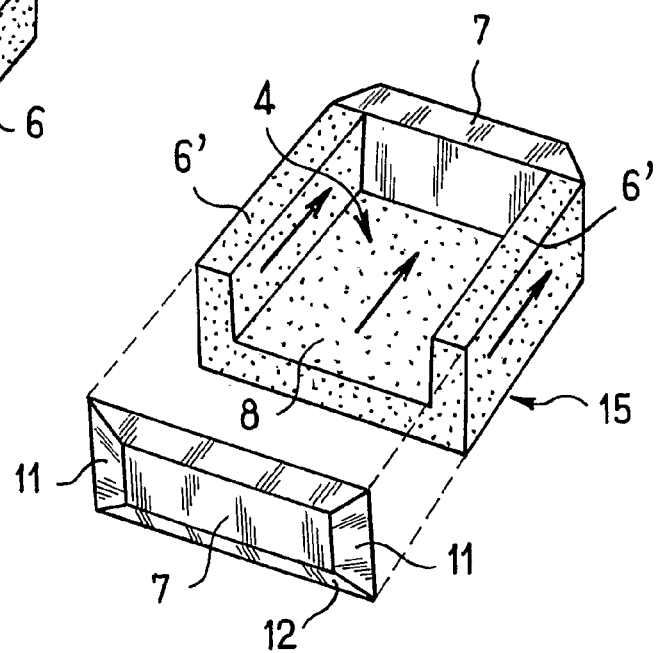

FIG_4
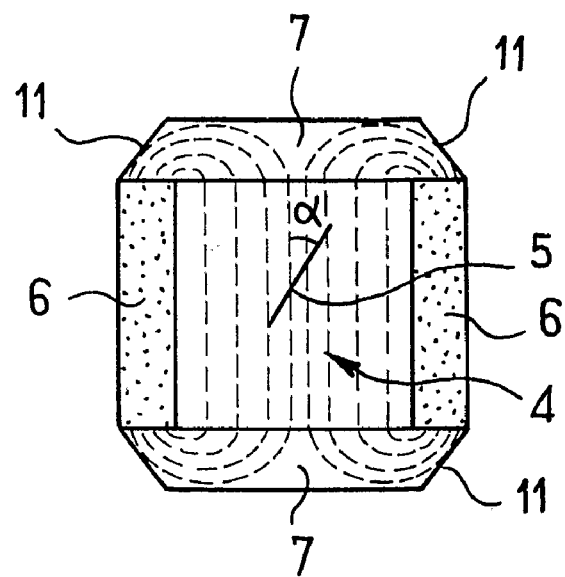
FIG_5
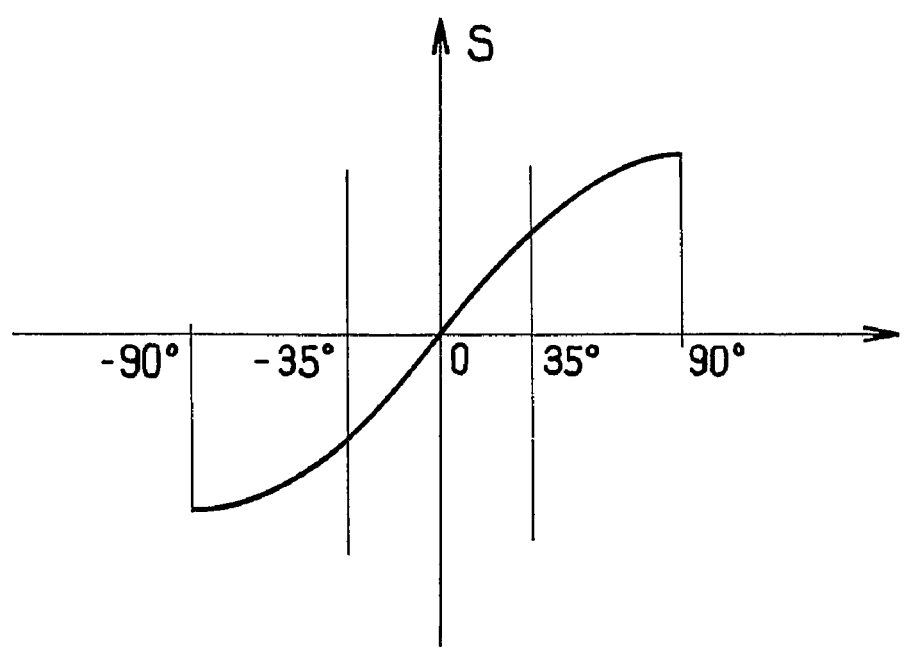

MAGNETIC ANGULAR-POSITION SENSOR

The invention relates to a magnetic angular-position sensor, in particular for a valve for regulating an exhaust gas recirculation system.

BACKGROUND OF THE INVENTION

Such valves comprise two carrier elements mounted to move in rotation relative to each other, e.g. the valve body and the shaft of the flow regulating butterfly (or the valve control shaft), together with a magnetic angular-position sensor mounted between the carrier elements. The sensor comprises firstly a magnetic member defining a working zone in which there extends a magnetic field having field lines perpendicular to the axis of rotation, and secondly a detector member having at least one magneto-sensitive probe extending in the working zone in a plane perpendicular to the plane of the field lines in order to provide an electric signal that is function of the angular orientation of the probe relative to the field lines that it intersects.

In general, it is desired to obtain sensors that deliver a linear signal. However this requirement for linearity means that the magnetic member must be given a structure that is complex, such that the resulting signal is very sensitive to the probe being offset relative to its nominal position in the working zone.

OBJECT OF THE INVENTION

An object of the invention is to provide a magnetic angular-position sensor that is relatively insensitive to the positioning of the probe relative to the magnetic member.

BRIEF SUMMARY OF THE INVENTION

According to the invention, the magnetic member comprises two parallel magnet segments and two elongate pole pieces of ferromagnetic material extending perpendicularly to the magnet segments and covering the ends thereof.

Such a configuration makes it possible to establish within the working zone an almost uniform magnetic field having field lines that extend from one pole piece to the other, perpendicularly thereto, such that the field lines are all parallel to one another.

Thus, whatever the position of the probe in the working zone, the probe intersects field lines that are all at the same angle and that all have the same intensity, such that the signal from the probe is independent of the position of the probe within the working zone. Assembly tolerances for the parts with which the sensor is associated therefore have no influence on the quality with which angle detection is performed by the sensor.

In addition, the magnetic member is particularly simple to fabricate.

In a variant embodiment of the invention, the magnet segments are bar magnets. The bars then co-operate with the pole pieces to form a magnetic frame defining the working zone.

In another variant embodiment of the invention, the magnetic member comprises a U-shaped magnet having flanges forming the magnet segments and a web forming a bottom for the magnetic member.

Thus, the magnetic member takes the form of a dish and the base of the magnet contributes to increasing the intensity of the magnetic field in the working zone, thereby improving the sensitivity of the sensor.

According to a particular aspect of the invention, the pole pieces have ends that are chamfered. Thus, the chamfers channel the field lines and limit magnetic losses in the ends of the pole pieces, thus making it possible also to increase the intensity of the magnetic field and thus improve the sensitivity of the sensor.

According to another particular aspect of the invention, the sensor is connected to the two carrier elements in such a manner that the probe moves over a detection range for which the signal from the detector is substantially linear. Thus, an almost linear response is obtained for the sensor without it being necessary to provide a particular shape for the pole pieces.

BRIEF DESCRIPTION OF THE DRAWINGS

The invention can be better understood in the light of the following description given with reference to the figures of the accompanying drawings, in which:

FIG. 1 is an exploded perspective view of a magnetic angular-position sensor of the invention;

FIG. 2 is a perspective view of the magnetic member of the angular-position sensor in a first variant embodiment;

FIG. 3 is an exploded perspective view of the magnetic member of the angular-position sensor in a second variant embodiment;

FIG. 4 is a plan view of the magnetic member with the field lines being shown therein; and FIG. 5 is a graph plotting variation in the signal from a Hall effect sensor as a function of the relative angular position between the two carrier elements on which the sensor is mounted.

DETAILED DESCRIPTION OF THE INVENTION

With reference to FIG. 1, the sensor of the invention is for mounting in conventional manner in a device comprising a first carrier element 1 and a second carrier element 2, which elements are movable in rotation relative to each other about an axis of rotation X. The first carrier element is constituted, for example, by a plate 1 secured to the end of control shaft 10 for controlling the position of a butterfly member mounted to pivot inside the body of a valve, while the second carrier element is a plate 2 secured to the valve body.

The magnetic angular-position sensor comprises firstly a magnetic member 3 secured to the first carrier element 1 and defining internally a working zone 4, secondly a detector member comprising a magnetosensitive probe 5 secured to the second carrier element 2. By way of example, the probe 5 is of the Hall effect type, or it may be of the magnetoresistive type.

In FIG. 1, the elements 1 and 2 are shown prior to assembly. After assembly, the probe 5 extends inside the working zone 4.

In a first variant embodiment shown in FIG. 2, the magnetic member 3 is in the form of a frame and comprises two bar magnets 6 disposed in parallel to define two sides of the frame, and two pole pieces 7 of ferromagnetic material disposed perpendicularly to the bar magnets 6 to define the other two sides of the frame. The pole pieces 7 cover the ends of the bar magnets 6 and have chamfered edges 11 at the outer corners of the frame.

The magnetic frame as formed in this way defines the working zone 4 in which a magnetic field is established having field lines that are drawn dashed lines in FIG. 4. In this figure, it can be seen that the field lines that escape from the ends of the bar magnets 6 are channeled by the chamfers 11 of the pole pieces 7, and then extend from one pole piece 7 to the other in a direction that is perpendicular thereto. The magnetic field in the working zone 4 thus presents field lines that are parallel and of intensity that is almost constant over the entire working zone 4.

In another variant embodiment, shown in FIG. 3, the magnetic member 3 is in the form of a dish comprising firstly a U-shaped magnet 15 with flanges 6' and a web 8, and secondly pole pieces 7 that extend to cover the ends of the U-shaped magnet 15. The flanges 6' perform a similar role to the bar magnets 6 in the above variant embodiment. Like the above embodiment, the pole pieces present chamfered edges 11 at their ends; they also present a bottom chamfered edge 12 such that the pole pieces have chamfered edges following the profile of the U-shaped magnet 15.

In this variant embodiment, the field lines are identical in appearance to those shown in FIG. 4. The only difference lies in the fact that additional field lines escape from the ends of the web 8 and transit in the chamfered edges 12 of the pole pieces 7 prior to extending from one pole piece to the other parallel to the field lines coming from the flanges 6', thereby contributing to increasing the intensity of the magnetic field in the working zone 4.

The top plane defining the frame or the dish of the magnetic member 3 is disposed substantially perpendicularly to the axis of rotation X, so the field lines extend perpendicularly to the axis of rotation X. When the probe 5 is in the assembled position, it therefore extends in the working zone 4 in a plane perpendicular to the plane of the field lines.

The use of a magnetic member of the invention that generates a uniform field presents several advantages:

such a magnetic member is particularly easy to fabricate. The parts making up the magnetic member 3 of the invention are simple in shape and can be stuck to one another or fitted within a non-magnetic support;

in addition, whatever the position of the probe 5, the probe 5 intersects field lines that are all at the same angle relative to the probe and that are all of the same intensity. Such a sensor is thus insensitive to misalignment of the two rotary elements, or to the probe 5 or the magnetic member 3 being positioned off-center relative to the axis of rotation X. Such a sensor is also insensitive to variations in the extent to which the probe 5 penetrates into the working zone 4, providing the probe 5 is entirely immersed in the magnetic field that exists within the working zone 4.

FIG. 5 shows the sinusoidal output signal from a Hall effect sensor as a function of the angle $\alpha$ of the probe about the axis X (see FIG. 4). The probe 5 and the magnetic member 3 are preferably connected to the carrier element in such a manner that during relative movement of the carrier element, the probe 5 pivots relative to the magnetic member 3 over a working range of 35° on either side of a position for which the magnetic field measured by the probe 5 is zero. Over this range, the signal S from the probe 5 remains substantially linear.

The invention is not limited to the particular embodiments described above, but covers more generally any variant coming within the ambit of the invention as defined by the claims.

In particular, although the pole pieces 7 are shown as being chamfered, thus making it possible to limit magnetic losses by eliminating dead zones in which the field lines pass without being useful, the pole pieces 7 could have sharp corners.

Although the detector member associated with the magnetic member is constituted in this example by a single probe 5, the detector could have a plurality of probes that are superposed or that are offset angularly.

What is claimed is:

1. A magnetic angular-position sensor mounted between two carrier elements that are movable in rotation relative to each other about an axis of rotation, the sensor comprising:

firstly a magnetic member defining a working zone in which there extends a magnetic field having field lines perpendicular to the axis of rotation; and secondly a detector member comprising at least one probe extending in the working zone of the magnetic member in order to provide a signal as a function of the angular orientation of the probe relative to the field lines in the working zone, wherein the magnetic member comprises two parallel bar magnet segments and two elongate pole pieces of ferromagnetic material extending perpendicularly to the bar magnet segments and covering the ends thereof, wherein the magnetic member is in the form of a frame so that field lines are parallel, and wherein the pole pieces have chamfered ends.

2. The sensor according to claim 1, wherein the magnetic member comprises a U-shaped magnet having flanges forming the bar magnet segments and a web forming a bottom for the magnetic member.

3. The sensor according to claim 2, wherein the pole pieces have edges that are chamfered following a profile of the U-shaped magnet.

4. The sensor according to claim 1, wherein the sensor is connected to the two carrier elements in such a manner that the signal provided by the detector is a linear function of the angular orientation of the probe.

5. The sensor according to claim 4, wherein the probe moves over a detection range extending over 35° on either side of the position in which the magnetic field measured by the probe is zero.

* * * * *